United States Patent [19]

Guenther

[11] Patent Number: 5,161,291
[45] Date of Patent: Nov. 10, 1992

[54] ADJUSTABLE MACHINING APPARATUS FOR MACHINING A CYLINDRICAL WORKPIECE

[75] Inventor: Paul Guenther, Murrysville, Pa.

[73] Assignee: Westinghouse Electric Corp., Pittsburgh, Pa.

[21] Appl. No.: 823,404

[22] Filed: Jan. 21, 1992

[51] Int. Cl.$^5$ .................. B23Q 1/18; B23C 1/20
[52] U.S. Cl. .................. 29/56.5; 51/241 S; 409/176; 409/178
[58] Field of Search .................. 29/56.5, 39, 54, 55, 29/26 B, 33 T; 409/175, 176, 177, 178, 179, 180, 201, 211, 216, 191; 51/241 S

[56] References Cited

U.S. PATENT DOCUMENTS

| | | | |
|---|---|---|---|
| 2,619,880 | 12/1952 | Hosea | 409/175 |
| 2,633,776 | 4/1953 | Schenk . | |
| 3,573,590 | 4/1971 | Reed | 318/618 |
| 3,596,558 | 8/1971 | Rydell | 409/178 |
| 3,769,756 | 11/1973 | Kipple et al. | 51/43 |
| 3,898,491 | 8/1975 | Long et al. | 310/184 |
| 4,202,084 | 5/1990 | Piguet | 29/156.8 R |
| 4,775,270 | 10/1988 | Katayama et al. | 29/156.8 CF |
| 4,799,337 | 1/1989 | Kotthaus | 51/287 |
| 4,949,444 | 8/1990 | Kojima et al. | 29/27 R |
| 5,030,041 | 7/1991 | Marron | 408/83.5 |
| 5,032,051 | 7/1991 | Gilmore | 409/175 |
| 5,106,243 | 4/1992 | Hunt | 51/241 S X |

FOREIGN PATENT DOCUMENTS

| | | | |
|---|---|---|---|
| 2552742 | 5/1977 | Fed. Rep. of Germany | 409/175 |
| 610618 | 6/1978 | U.S.S.R. | 409/201 |
| 691251 | 10/1979 | U.S.S.R. | 409/180 |
| 697263 | 11/1979 | U.S.S.R. | 409/178 |

OTHER PUBLICATIONS

Document entitled "Master Portable Machine Tools", by Master Manufacturing Co., Inc.

*Primary Examiner*—William Briggs
*Attorney, Agent, or Firm*—Walter S. Stevens

[57] ABSTRACT

Adjustable machining apparatus for machining a cylindrical workpiece, such as an electrical generator rotor or stator. The apparatus includes a spindle for holding a cutting tool, which spindle in turn is engaged by a motor for rotating the spindle and cutting tool. Attached to the spindle is a swivel for pivoting the spindle about a pivot point laying on a first axis parallel to the longitudinal axis of the workpiece. A first translation mechanism is attached to the swivel for moving the swivel along a second axis perpendicular to the first axis. A second translation mechanism is connected to the first translation mechanism for moving the first translation mechanism along a third axis transverse to the longitudinal axis of the workpiece. A third translation mechanism is connected to the second translation mechanism for moving the second translation mechanism along a fourth axis paralle to the longitudinal axis of the workpiece. The apparatus is removably attachable to the workpiece, such as by electromagnets. Thus, the apparatus is removably attachable to the workpiece and operable to provide four degrees of freedom of movement to the cutting tool.

21 Claims, 11 Drawing Sheets

ADJUSTABLE MACHINING APPARATUS FOR MACHINING A CYLINDRICAL WORKPIECE

BACKGROUND

This invention generally relates to machining apparatus and more particularly relates to an adjustable machining apparatus for machining a cylindrical workpiece, such as an electrical generator rotor or stator.

Before addressing the current state of the art, it is instructive first to briefly discuss the structure and operation of a typical electrical generator. In this regard, an electrical generator is part of a coupled turbine-generator set that converts the mechanical power of the turbine into electricity. More specifically, steam is piped to the turbine where it impinges a plurality of turbine blades surrounding and attached to a rotatable turbine shaft. The force of the steam impinging the turbine blades produces a reactive force that is transferred from the turbine blades to the turbine shaft for rotating the shaft. In this manner, the steam imparts mechanical power to the turbine shaft. As the turbine shaft rotates, the mechanical power imparted to the shaft is transferred to the generator because the turbine shaft is coupled to the generator. As discussed more fully hereinbelow, the generator converts this mechanical power into electricity.

The generator includes a rotatable cylindrical rotor shaft forging having a plurality of rotor teeth integrally formed therewith around the circumference of the rotor shaft. Coils of wire are interposed between the rotor teeth for conducting electricity and wedges are press fit between the rotor teeth and placed on top of the wire coils for transmitting the centrifugal load of the coils to the rotor teeth when the rotor shaft is rotating. The rotor shaft is thus constructed such that the wire coils are fixed in position on the rotor shaft by the rotor teeth and wedges.

Another set of wire coils is embedded in the surface of an axial bore that extends through a stationary cylindrical stator. The rotor shaft is freely rotatably disposed in the axial bore of the stator and rotates as the turbine shaft rotates because the rotor shaft is coupled to the turbine shaft. In order to electrically excite the rotor coils, direct current is fed to the rotor coils typically through brushes contacting an end of the rotor shaft. As well understood in the art, a magnetic field is produced around the rotor shaft by the excited rotor coils when the rotor shaft rotates. This magnetic field passes through the wire coils embedded in the stator for inducing an electrical voltage in the stator wire coils. The electrical voltage induced in the stator coils is fed to an external electrical system for supplying electricity to a connected system load.

The rotor teeth themselves are machined into the rotor forging and are designed to have a uniform density and also are intended to be uniformly annealed during the forging process to avoid undesirable internal strains. However, on occasion some of the rotor teeth may contain flaws due, for example, to localized inhomogeneities or non-uniform annealing. Such flaws ultimately could lead to a phenomenon known in the art as stress corrosion cracking during generator operation. As the rotor shaft rotates at high speed, centrifugal force is developed in the rotor teeth that are formed around the circumference of the rotor shaft. This centrifugal force in combination with stress corrosion cracking may result in the flaw or crack propagating through a rotor tooth to cause a portion of the rotor tooth to separate from the rotor shaft and become a high-velocity missile that might impact and damage the generator internals. Of course, such flaws may also develop in the stator teeth. Therefore, a suitable nondestructive examination technique, such as ultrasonic examination, is used to inspect the rotor and stator teeth for flaws and cracks. Of course, once such flaws and cracks are discovered, they are removed, such as by milling.

A prior art machining device has been used to repair cracked rotor teeth. In this regard, the rotor is removed from the generator and disposed adjacent the machining device and rotated to bring any cracked rotor tooth into alignment with a cutting head belonging to the machining device. The machining device is then operated in a manner to mill or remove cracks from the rotor tooth. This process requires the rotor to be repeatedly rotated or adjusted to machine a plurality of cracked rotor teeth because the machining device is designed to be stationary. Also, because the machining device is stationary, the rotor also has to be translated or adjusted along its longitudinal axis so that the machining device can mill cracked rotor teeth located at various longitudinal portions of the rotor.

Although the above recited prior art machining device satisfactorily machines cracked rotor teeth, it requires the rotor to be repeatedly repositioned and adjusted in order to align the machining device's cutting head with a plurality of cracked rotor teeth. Such repositioning and readjustments prolonged the machining operation. Moreover, such a machining device is not suitable for machining cracked stator teeth located in the bore of the stator.

Therefore, what is needed is an adjustable machining apparatus for machining a cylindrical workpiece, which machining apparatus obviates the need to repeatedly adjust or reposition the workpiece in order to machine it.

SUMMARY

Disclosed herein is an adjustable machining apparatus for machining a cylindrical workpiece having a longitudinal axis, such as an electrical generator rotor or stator. The apparatus comprises gripper means for gripping a tool capable of machining the workpiece; pivot means, connected to the gripper means, for pivoting the gripper means about a pivot point on a first axis parallel to the longitudinal axis of the workpiece; first translation means, connected to the pivot means, for translating the pivot means toward and away from the workpiece along a second axis perpendicular to the first axis; second translation means, connected to the first translation means, for translating the first translation means along a third axis transverse to the longitudinal axis of the workpiece; third translation means, connected to the second translation means, for translating the second translation means along a fourth axis parallel to the longitudinal axis of the workpiece; and attachment means, connected to the third translation means for removably attaching the third translation means and thus the apparatus to the workpiece.

More specifically, the apparatus includes a spindle that grips a cutting tool, such as a milling cutter, that is sized to be interposed between adjacent rotor teeth belonging to a rotor shaft for removing a cracked portion of a flawed rotor tooth. A variable speed reversible motor engages the spindle for rotating the spindle and the cutting tool gripped by the spindle. Connected to the spindle is a swivel capable of pivoting the spindle in a predetermined arc about a pivot point laying on a first axis which is parallel to the longitudinal axis of the rotor shaft. In this manner, the pivoting action of the swivel is capable of disposing the cutting tool into cutting contact with the cracked portion of the flawed rotor tooth.

The apparatus further includes an elongate first frame having a track portion thereon. A cross slide or first carriage is attached to the swivel and slidably engages the track portion of the first frame for slidably translating the swivel toward and away from the rotor along a second axis which is perpendicular to the first axis. The first carriage has an attached nut member having an internally threaded bore therethrough for threadably receiving a first lead screw rotatably connected to the first frame. In this manner, the first carriage is slidably translated along the second axis as the first lead screw rotates.

The apparatus also includes a second frame having an elongate track portion thereon. Another cross slide or second carriage is connected to the first frame and slidably engages the track portion of the second frame for slidably translating the first frame along a third axis which is transverse to the longitudinal axis of the rotor shaft. The second carriage has an attached nut member having a threaded bore therethrough for threadably receiving a second lead screw rotatably connected to the second frame. In this manner, the second carriage is slidably translated along the third axis as the second lead screw rotates.

In addition, the apparatus includes a base having an elongate track portion thereon. Yet another cross slide or third carriage is connected to the second frame and slidably engages the track portion of the base for slidably translating the second frame along a fourth axis, which is parallel to the longitudinal axis of the rotor shaft. The third carriage has an attached nut member having a threaded bore therethrough for threadably receiving a third lead screw rotatably connected to the base. In this manner, the third carriage is slidably translated along the fourth axis as the third lead screw rotates. Moreover, a key outwardly extends from the bottom of the base and matingly engages the space between preselected spaced-apart rotor teeth for stabilizing the apparatus on the rotor. In addition, a plurality of electromagnets are connected to the base for removably attaching the base and thus the apparatus to the exterior surface of the rotor shaft when the magnets are energized.

Each lead screw may be attached to a handle that is rotated manually or, alternatively, each lead screw may be engaged by automatic electrically-operable feed means for rotating the lead screws that in turn feed each carriage along its associated axis.

Thus, the adjustable machining apparatus disclosed herein allows the cutting tool to have four degrees of freedom of movement for adjusting the cutting tool into precise cutting engagement with the cracked portion of the flawed rotor tooth. That is, the cutting tool is pivotable about the first axis by means of the swivel, thus providing a first degree of freedom. The cutting tool is also translatable along the second axis by means of the first carriage belonging to the first frame, thus providing a second degree of freedom. In addition, the cutting tool is translatable along the third axis by means of the second carriage belonging to the second frame, thus providing a third degree of freedom. Moreover, the cutting tool is translatable along the fourth axis by means of the third carriage belonging to the base, thus providing a fourth degree of freedom. Therefore, the apparatus enables the cutting tool to be adjustably selectively positioned along four axes to precisely cut or remove the cracked portion of the rotor tooth. In addition, the electromagnets allow the machining apparatus to be quickly attached to and detached from the rotor shaft for machining cracked rotor teeth at different locations on the rotor shaft. Thus, the adjustable machining apparatus of the present invention obviates the need for the rotor itself to be repeatedly rotated and translated to machine a plurality of cracked rotor teeth located at different locations on the rotor. This results in the machining operation being performed in a shorter time than the machining operation performed with the prior art stationary machining device. In a similar manner, the machining apparatus of the present invention is also capable of machining cracked stator teeth.

An object of the invention is to provide an adjustable machining apparatus capable of quickly and precisely machining a cylindrical workpiece.

A feature of the invention is the provision of means for moving a cutting tool along four degrees of freedom for precisely adjustably machining the workpiece.

Another feature of the invention is the provision of electromagnets for quickly removably attaching the machining apparatus to the workpiece.

An advantage of the invention is that the machining apparatus itself is adjustable so that there is no need to manipulate or adjust the workpiece in order to quickly and precisely machine the workpiece.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

BRIEF DESCRIPTION OF THE PREFERRED EMBODIMENTS

An electrical generator rotor or stator tooth may experience cracking due to localized inhomogeneities, non-uniform annealing and/or stress corrosion cracking. Such a tooth may separate from the rotor or stator during generator operation and thus may become a high-velocity missile that may ultimately damage the generator internals. Hence, it is desirable to repair such a cracked rotor or stator tooth prior to its separation to avoid possible damage to the generator internals. Therefore, disclosed herein is an adjustable machining apparatus for repairing cracked rotor or stator teeth.

However, before describing the subject matter of the present invention, it is instructive first to briefly describe the structure and operation of a typical electrical generator.

Figure 1:
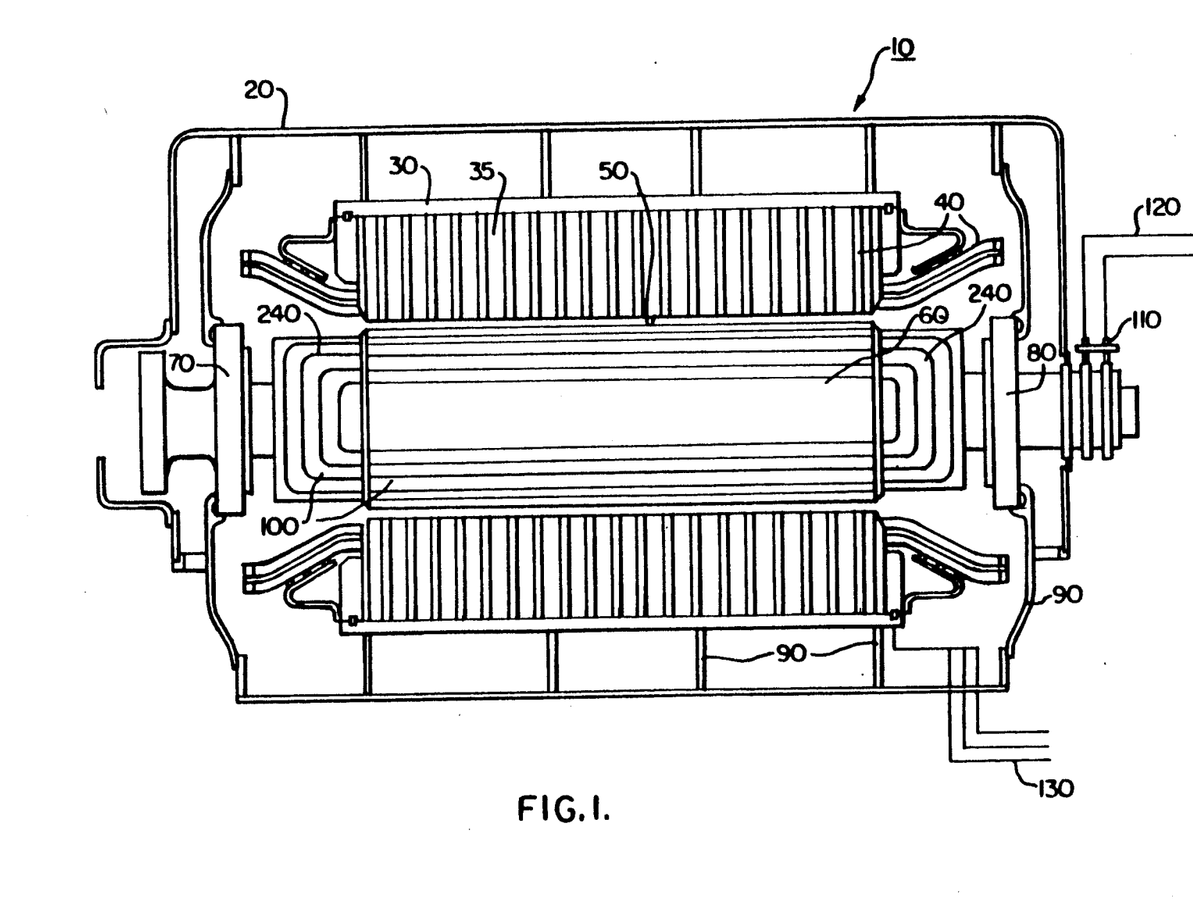
FIG. 1 illustrates in partial vertical section an electrical generator with parts removed for clarity.

Therefore, referring to FIG. 1, there is shown an electrical generator, generally referred to as 10, for converting mechanical power into electricity. Generator 10 includes a housing 20 for enclosing a generally cylindrical stator 30 comprising a stator core 35. Stator core 35 includes an axial bore 50 therethrough having a plurality of electrically-conducting wires or windings 40 embedded in the circumferential surface of axial bore 50. A generally cylindrical rotatable rotor 60 having a first end portion 70 and a second end portion 80 is received through axial bore 50. A plurality of supports 90 are disposed internally of housing 20 for supporting first end portion 70 and second end portion 80 of rotor 60 and for laterally supporting stator 30. First end portion 70 is coupled to a turbine shaft (not shown) for receiving the mechanical power produced by the turbine. As disclosed in more detail hereinbelow, embedded in the periphery of rotor 60 are a plurality of stacked or built-up electrically-conducting wire coils 100, which may be copper or the like. In addition, a plurality of brushes 110 connected to electrically-conducting exciter wires 120 contact second end portion 80 for electrically exciting wire coils 100, the exciter wires 120 being connected to a source (not shown) of direct current electricity. Moreover, electrically-conducting lead wires 130 are connected to stator coils 40 for delivering alternating current electricity produced by generator 10 to a connected system load, such as an electrical substation or transmission line (not shown).

During operation of generator 10, rotor 60 rotates as the turbine shaft rotates because first end portion 70 of rotor 60 is coupled to the turbine shaft. Rotor coils 100 are excited by the electrical current which is fed to rotor coils 100 through brushes 110. As rotor 60 rotates and as electrical current is fed to rotor coils 100, a magnetic field is produced around rotor 60 for inducing voltage in stator coils 40. The voltage induced in stator coils 40 is fed by lead wires 130 to the connected system load.

Figure 2:
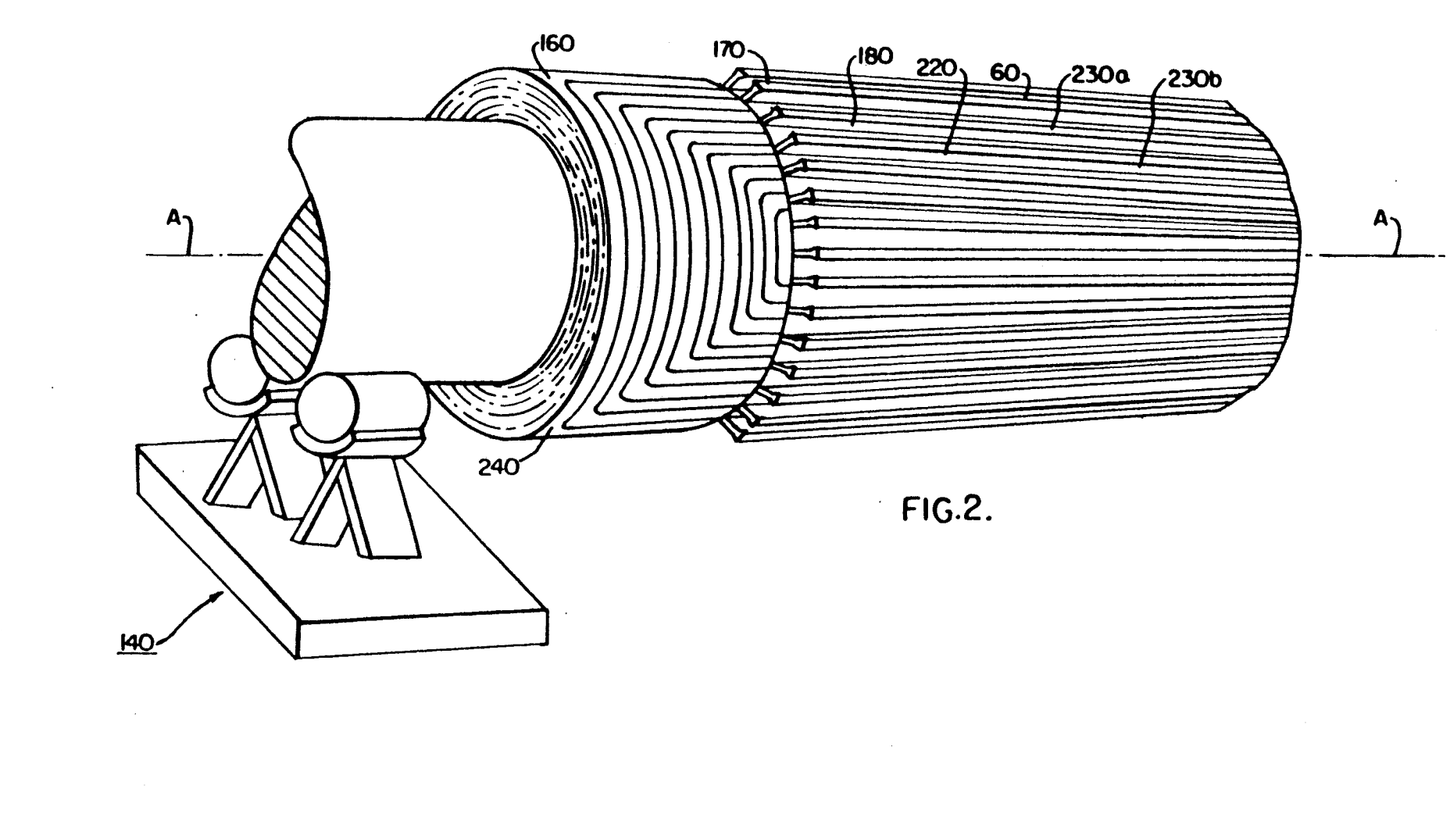
FIG. 2 is a fragmentary view of a generator rotor belonging to the electrical generator, the rotor being mounted on a support member in preparation for machining.
Figure 3:
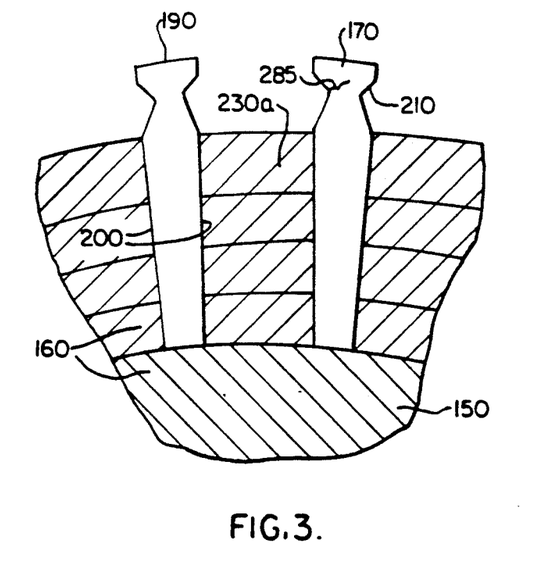
FIG. 3 is a fragmentary view in partial vertical section of the rotor showing spaced-apart rotor teeth and wire coils interposed therebetween and also showing a cracked portion, exaggerated for clarity, in one of the rotor teeth.

With reference to FIGS. 2 and 3, rotor 60 is there illustrated disposed on a support member 140 after rotor 60 has been removed from generator 10 in a manner well known in the art. Rotor 60 comprises a generally cylindrical rotor core 150 defining a longitudinal axis "A" therethrough. Moreover, rotor core 150 is made of a magnetic material, such as a carbon steel alloy or the like. Disposed circumferentially around rotor core 150 and integrally formed therewith are a plurality of raised spaced-apart rotor teeth 170, each rotor tooth 170 extending longitudinally along a middle portion 180 of rotor core 150. Thus, each rotor tooth 170 extends radially outwardly from rotor core 150 and parallel to the longitudinal axis "A" thereof. Moreover, each rotor tooth 170 has a top surface 190 thereon and two parallel side surfaces 200 depending from top surface 190. The contour of each side surface may be such that an inwardly-sloped fillet 210 is formed therein near top surface 190, fillet 210 extending longitudinally in each side surface 200. Thus, each rotor tooth 170 may have a generally "T"-shaped transverse cross section.

As illustrated in FIGS. 2 and 3, interposed between any two adjacent rotor teeth 170 are the plurality of stacked or built-up electrically conducting coils of wire 100. Each rotor coil 100 is embedded in the circumference of rotor core 150 so as to define a continuous generally rectangular configuration having two parallel segments 230a and 230b and having rounded end-turns 240 integrally formed therewith and located at first end portion 70 and second end portion 80 of rotor core 150. Mounted atop each stack of rotor coils 100 and engaging side surfaces 200 is a wedge (not shown) for transferring centrifugal force from wire coils 100 to rotor teeth 170 when rotor 60 rotates during generator operation.

Figure 4:
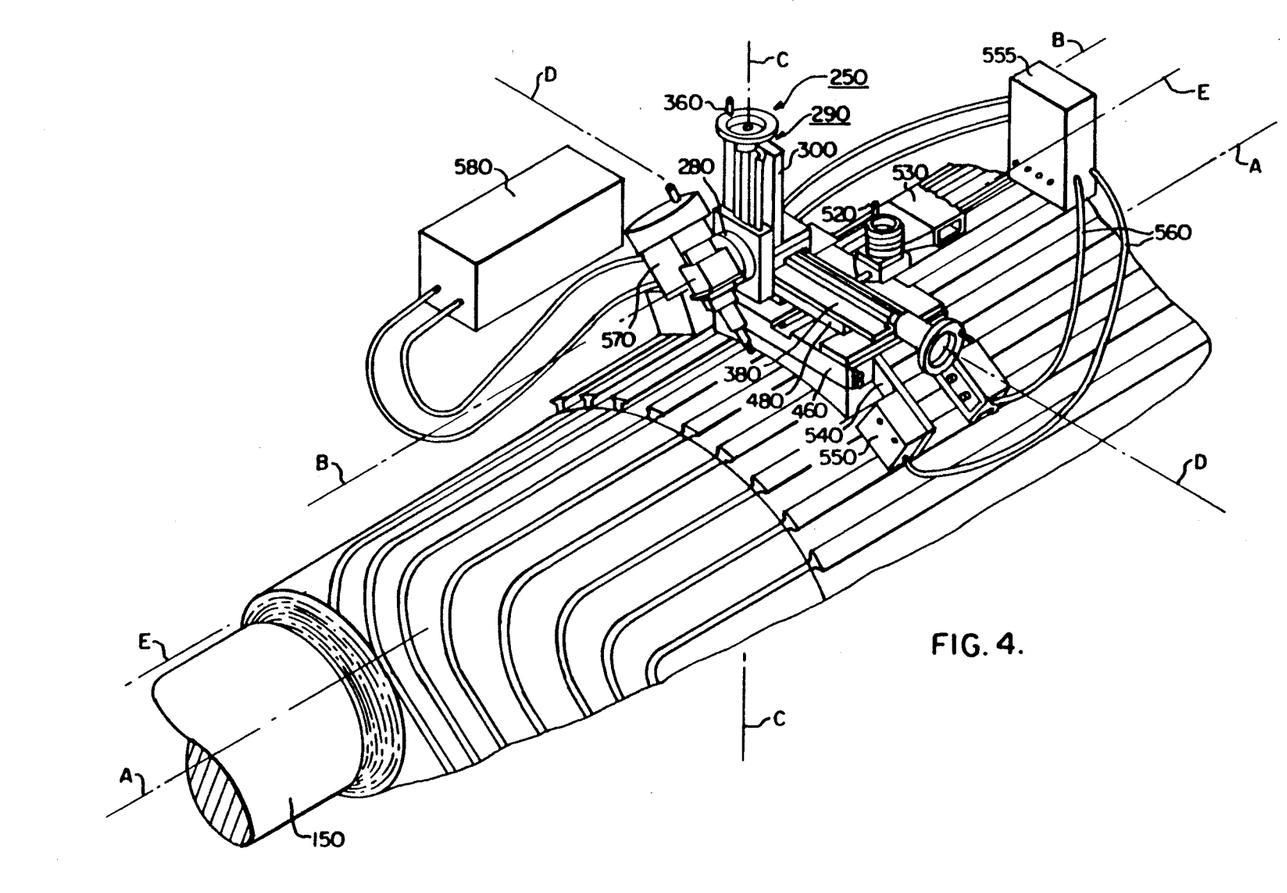
FIG. 4 is a perspective view of the machining apparatus of the invention mounted on the rotor to machine the cracked portion of the rotor tooth.
Figure 5:
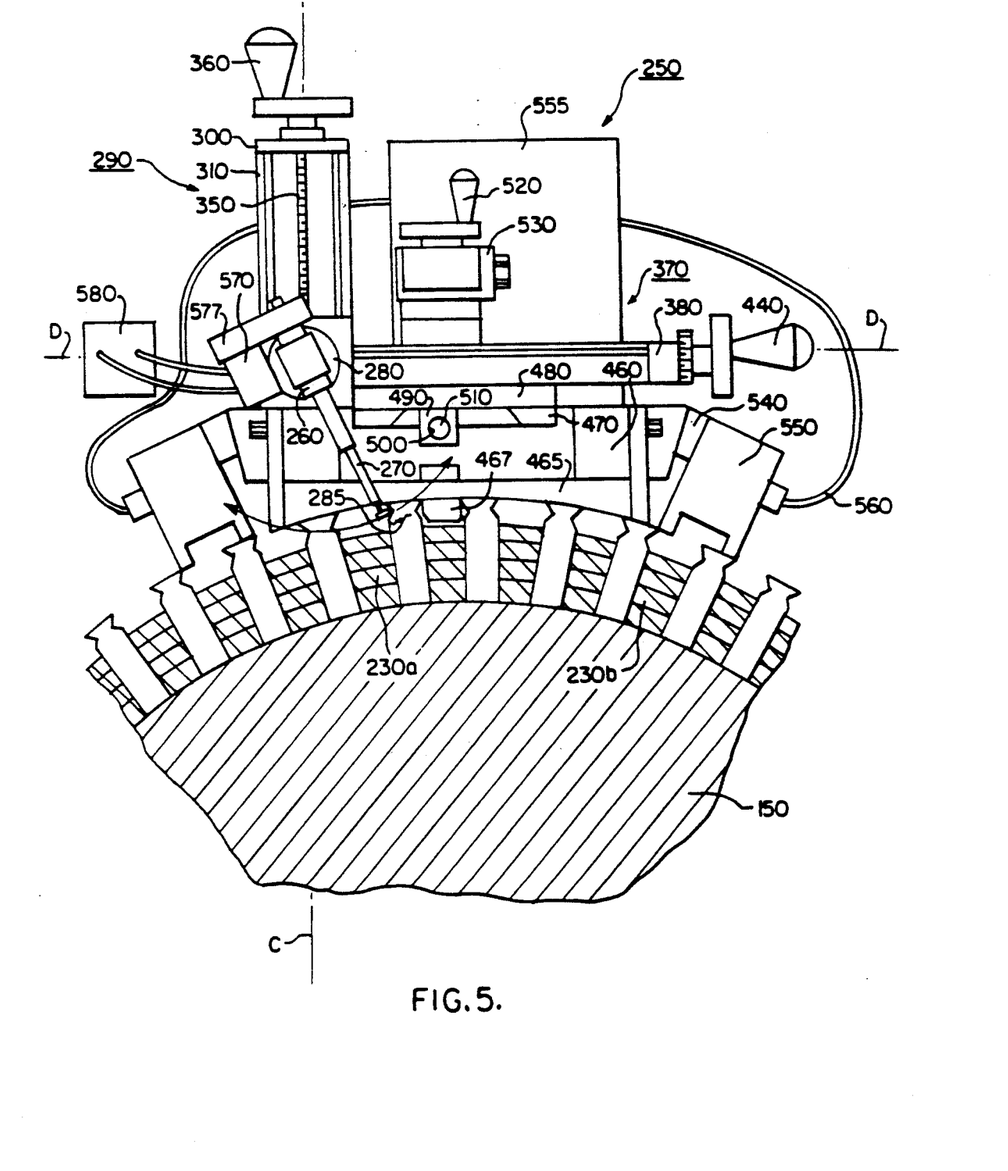
FIG. 5 is a view of the machining apparatus connected to the rotor and disposed to machine the cracked portion of the rotor tooth.
Figure 6:
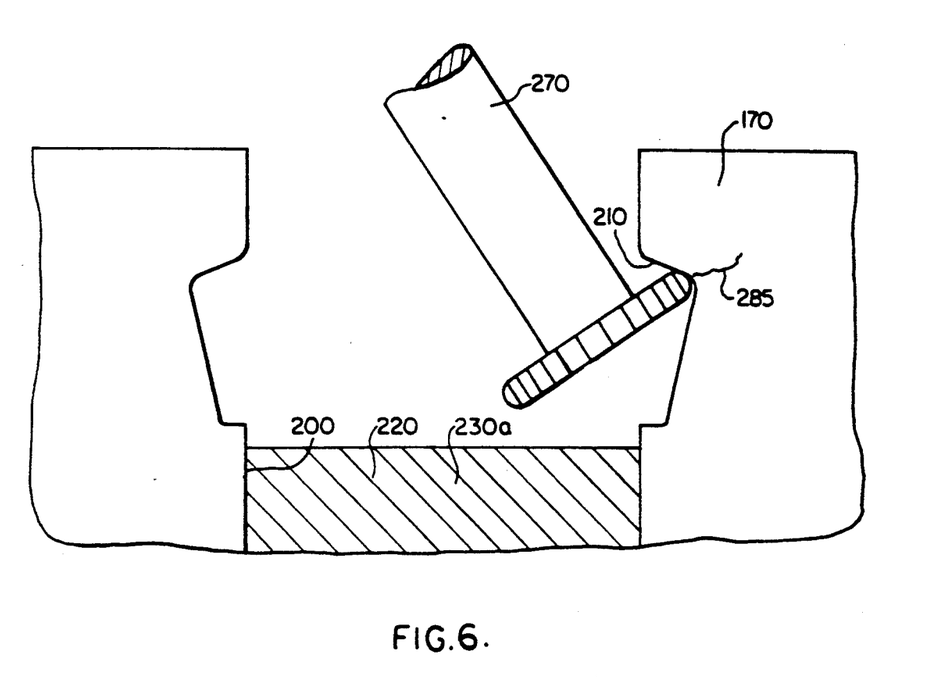
FIG. 6 is a fragmentary view of the rotor tooth to be machined showing a cutting tool engaging the cracked portion of the rotor tooth.
Figure 7:
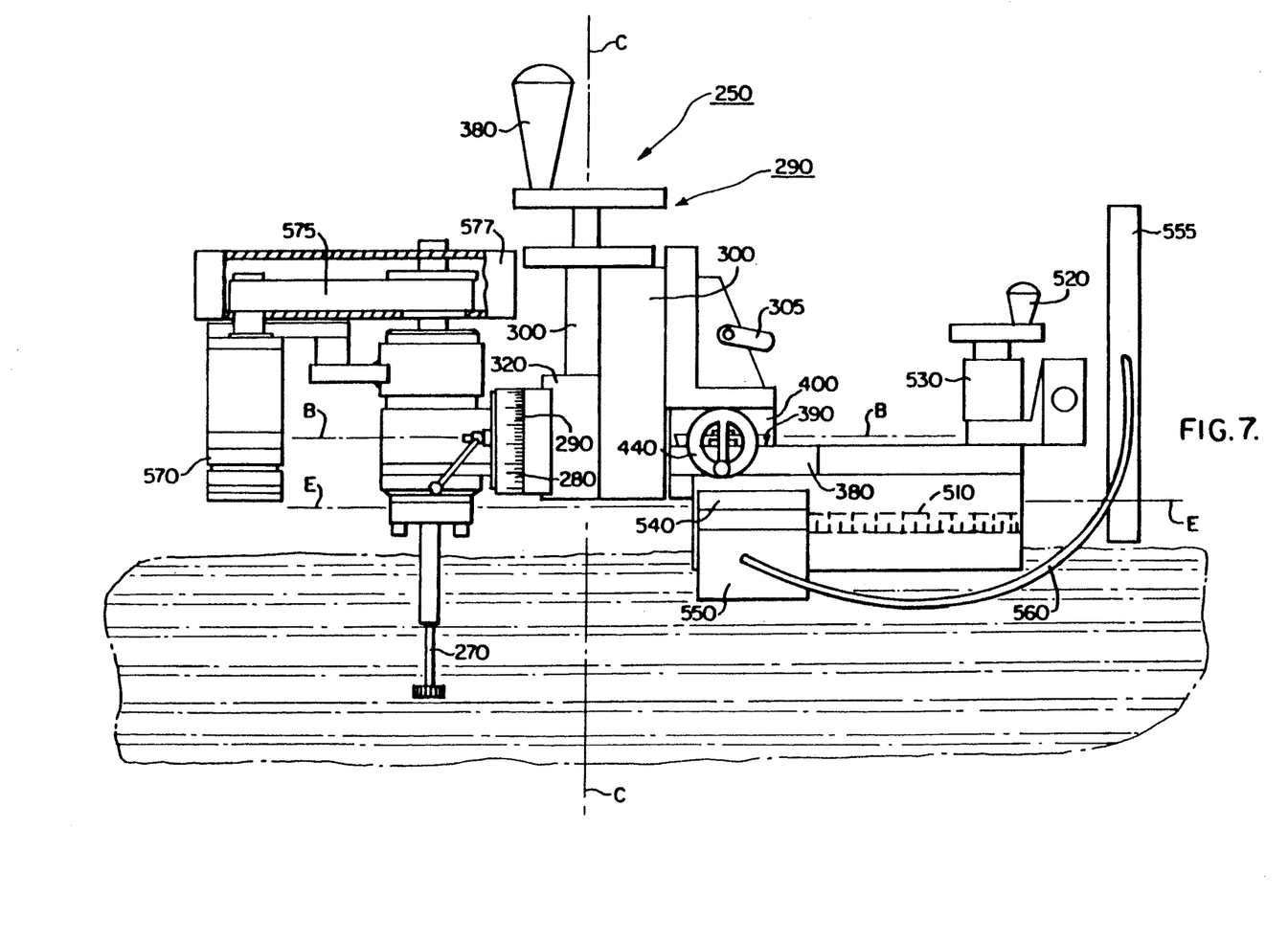
FIG. 7 is a lateral view of the machining apparatus.
Figure 8:
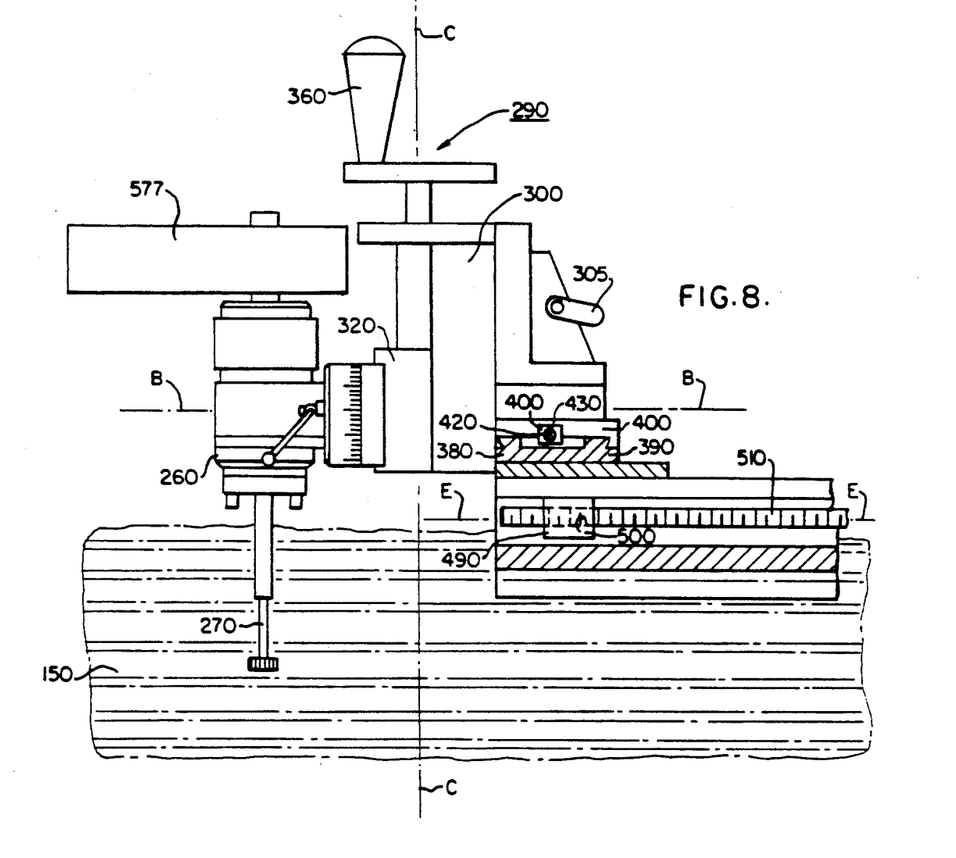
FIG. 8 is a fragmentary lateral view in partial vertical section of the machining apparatus.
Figure 9:
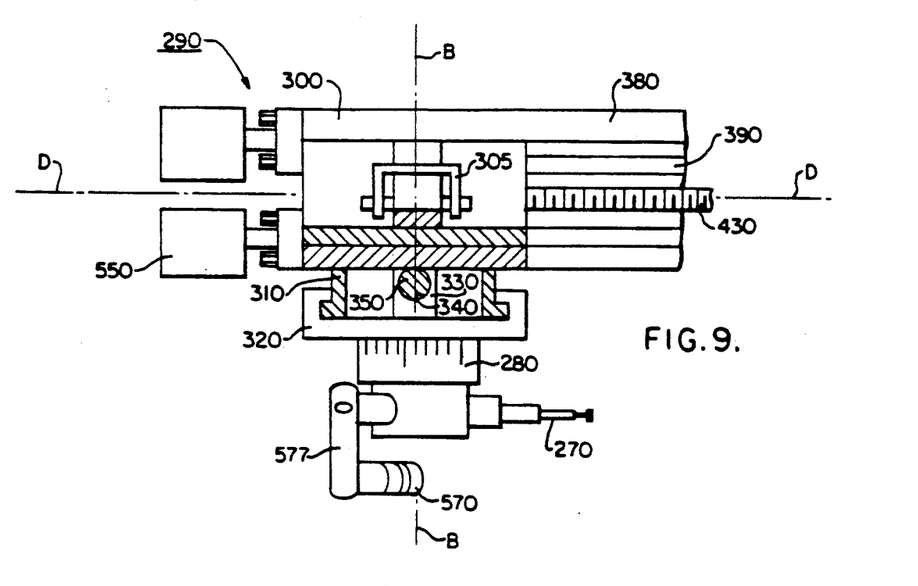
FIG. 9 is a fragmentary plan view in partial horizontal section of the machining apparatus.
Figure 10:
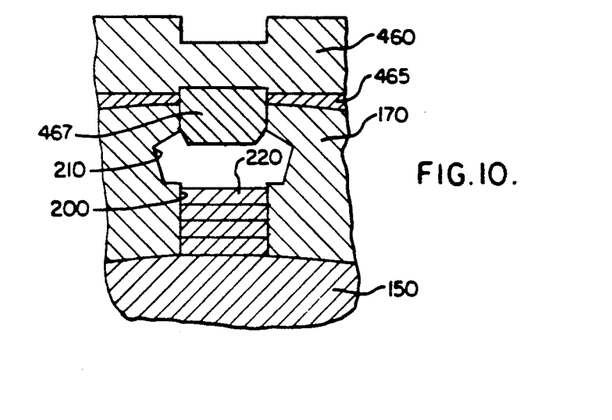
FIG. 10 is a fragmentary view in vertical section of a key engaging the space between preselected rotor teeth for stabilizing the machining apparatus.
Figure 11:
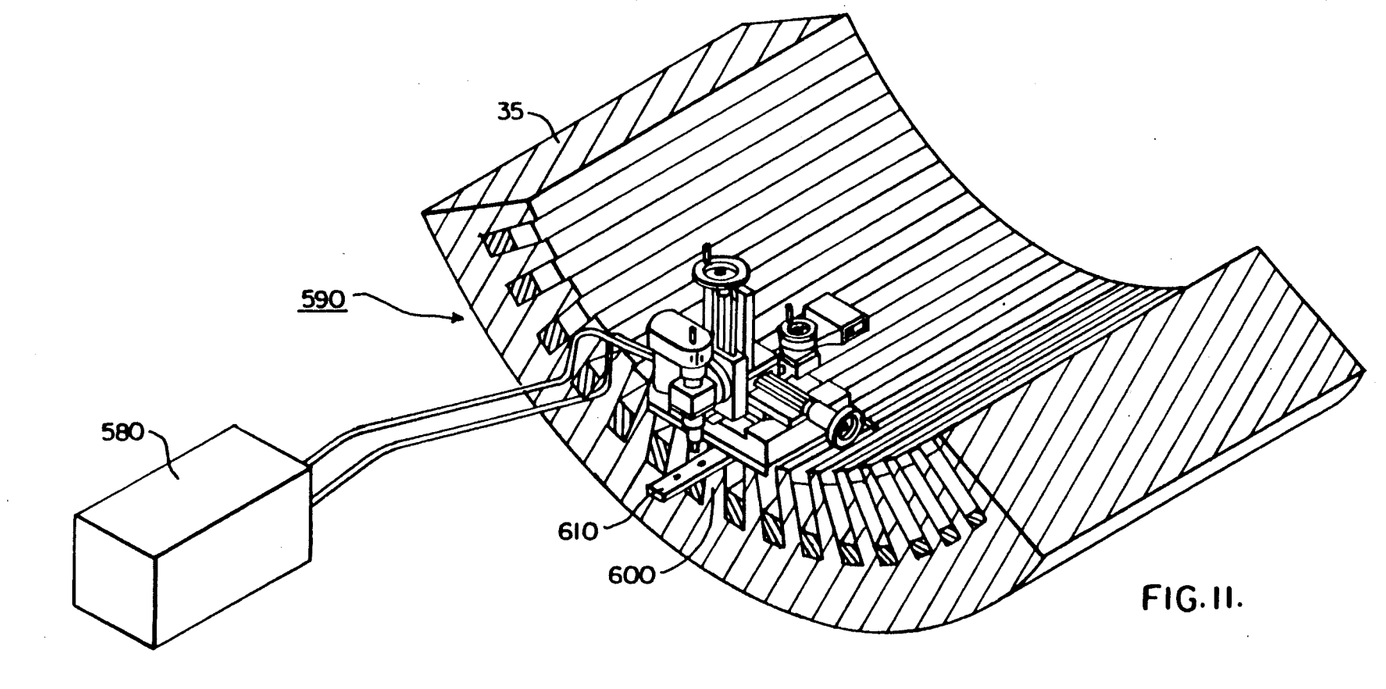
FIG. 11 is a perspective view of an alternative embodiment of the machining apparatus disposed on the inside diameter or bore of the stator in position to machine a cracked stator tooth.
Figure 12:
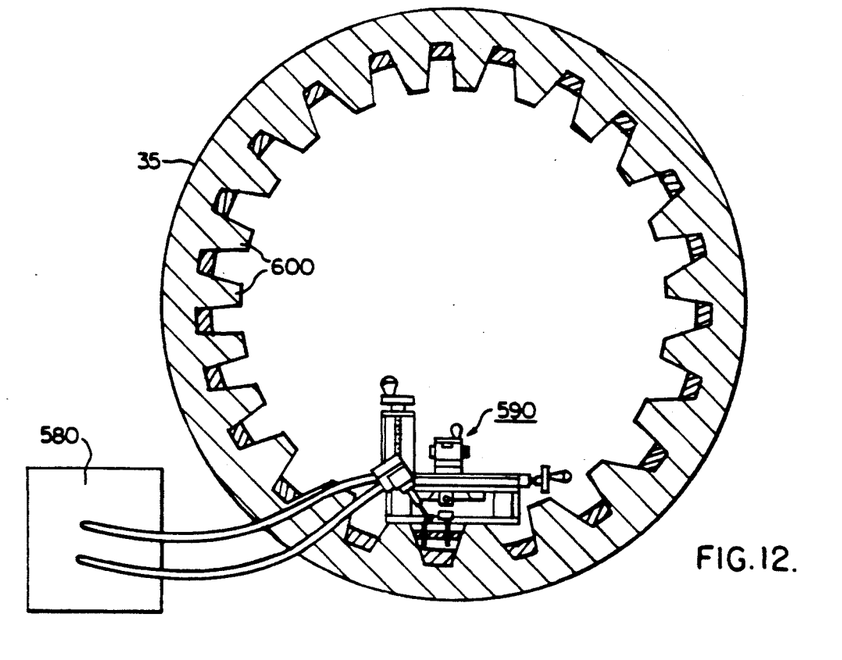
FIG. 12 is a view in vertical section of a stator having the alternative embodiment of the machining apparatus mounted on the inside diameter or bore of the stator.
Figure 13:
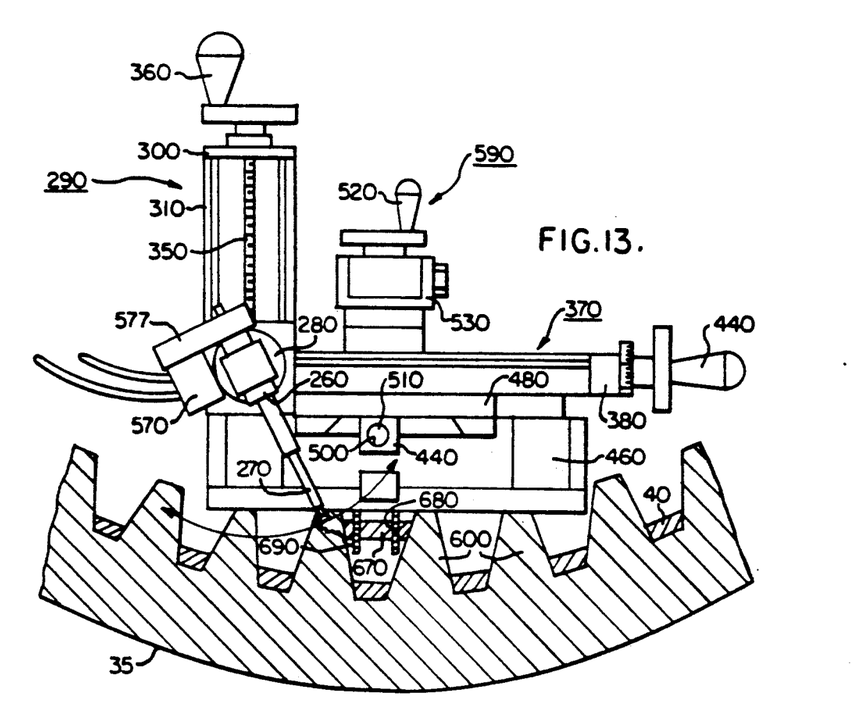
FIG. 13 is a fragmentation view of the stator having the alternative embodiment of the machining apparatus mounted on the inside diameter thereof for machining the cracked stator tooth.

Referring now to FIGS. 4 and 5, there is shown the subject matter of the present invention, which is an adjustable machining apparatus, generally referred to as 250, for machining a cylindrical workpiece, such as electrical generator rotor 60 or stator 30. Apparatus 250 comprises gripper means, such as a tool chuck or spindle 260, for securely clamping or gripping a machining tool capable of machining rotor 60. By way of example only, and not by way of limitation, the machining tool may be an elongate cutting tool 270, such as a milling cutter, capable of cutting or milling rotor tooth 170. Alternatively, the machining tool may be a grinder or drill (not shown). Cutting tool 270 is sized to be interposed between adjacent rotor teeth 170 for reasons disclosed hereinbelow. Connected to spindle 260 is pivot means, such as a rotatable swivel 280, for pivoting cutting tool 270 in a predetermined arc about a pivot point laying on a first axis "B" which is parallel to longitudinal axis "A" of rotor core 150. As described in more detail hereinbelow, swivel 280 is rotatable about the pivot point for disposing cutting tool 270 into cutting contact with a cracked portion 285, which may reside in the region of fillet 285, of rotor tooth 170. The predetermined arc or pivot angle through which cutting tool 270 pivots by means of swivel 280 is traced in FIG. 5 by a double-headed upwardly-curved concave arrow. Swivel 280, which may be rotated manually, may have a plurality of predetermined calibrated markings around the exterior thereof for visually observing and precisely measuring the predetermined arc or pivot angle of cutting tool 270 with respect to longitudinal axis "A".

Still referring to FIGS. 4 and 5, disposed adjacent and connected to swivel 280 is first translation means or mechanism, generally referred to as 290, for translating swivel 280 toward and away from rotor 60 along a second axis "C" which is perpendicular to first axis "B". First translation means 290 comprises an elongate first frame 300 extending along second axis "C". First frame 300 includes an integrally attached elongate track portion 310 thereon for reasons disclosed presently. First frame 300 also includes a hook 305 attached thereto and engageable by a hoist (not shown) for respectively mounting and dismounting machining apparatus 250 onto and away from rotor 60. Attached to swivel 280 and slidably engaging track portion 310 of first frame 300 is a translatable first carriage 320 for slidably translating swivel 280 toward and away from rotor 60 along second axis "C". First carriage 320 includes a nut member 330 attached thereto and having an internally threaded bore 340. An elongate externally threaded first rod or first lead screw 350 is rotatably connected to first frame 300 and threadably engages internally threaded bore 340 of nut member 330 for threadably slidably translating first carriage 320 on track portion 310 along second axis "C". Therefore, first carriage 320 translates along second axis "C" as first lead screw 350 rotates because first carriage 320 is integrally attached to nut member 330, which in turn is threadably engaged by first lead screw 350. Moreover, swivel 280 translates along second axis "C" as first carriage 320 translates along second axis "C" because swivel 280 is attached to first carriage 320. Attached to first lead screw 350 is a calibrated rotatable handle 360 for precisely rotating first lead screw 350.

Still referring to FIGS. 4 and 5, disposed adjacent and connected to first translation means 290 is second translation means or mechanism, generally referred to as 370, for translating first translation means 290 along a third axis "D" which is transverse to first axis "A" of rotor core 150. Second translation means 370 comprises an elongate second frame 380 extending along third axis "D". Second frame 380 includes an integrally attached elongate track portion 390 thereon for reasons disclosed presently. Attached to first frame 300 and slidably engaging track portion 390 of second frame 380 is a translatable second carriage 400 for slidably translating first frame 300 along third axis "D". Second carriage 380 includes a nut member 410 attached thereto and having an internally threaded bore 420. An elongate externally threaded second rod or second lead screw 430 is rotatably connected to second frame 380 and threadably engages internally threaded bore 420 of nut member 410 for threadably slidably translating second carriage 400 on track portion 390 along third axis "D". Therefore, second carriage 400 translates along third axis "D" as second lead screw 430 rotates because second carriage 400 is integrally attached to nut member 410, which in turn is threadably engaged by second lead screw 430. Moreover, first frame 300 translates along third axis "D" as second carriage 400 translates along third axis "D" because second carriage 400 is attached to first frame 300. Attached to second lead screw 430 is a calibrated rotatable handle 440 for precisely rotating second lead screw 430.

Referring yet again to FIGS. 4 and 5, disposed adjacent and connected to second translation means 370 is third translation means or mechanism, generally referred to as 450, for translating second translation means 370 along a fourth axis "E" parallel to longitudinal axis "A" of rotor core 150. Third translation means 450 comprises a base 460 which may include a concave portion 465 at the bottom thereof that matingly conforms to the convex contour of the circumferential exterior surface portion of rotor core 150 upon which base 460 rests when apparatus 250 is mounted on rotor 60. When concave portion 465 rests on the circumference of rotor core 150, the stability of apparatus 250 is increased because concave portion 465 limits any rocking motion of apparatus 250. Moreover, extending outwardly from base 460 toward the longitudinal axis "A" of rotor core 150 is a key 467 sized to matingly engage the space between preselected adjacent spaced-apart rotor teeth 170. The mating engagement of key 467 with this space functions as additional stabilizing means for stabilizing machining apparatus 250 because key 467 further limits any rocking motion of apparatus 250. Base 460 also includes an elongate track portion 470 thereon for reasons disclosed presently. Attached to second frame 380 and slidably engaging track portion 470 of base 460 is a translatable third carriage 480 for slidably translating second frame 380 along fourth axis "E". Third carriage 480 includes a nut member 490 attached thereto and having an internally threaded bore 500. An elongate externally threaded third rod or third lead screw 510 is rotatably connected to base 460 and threadably engages internally threaded bore 500 of nut member 490 for threadably slidably translating third carriage 480 along fourth axis "E". Therefore, third carriage 480 translates along fourth axis "E" as third lead screw 510 rotates because third carriage 480 is integrally attached to nut member 490, which in turn is threadably engaged by third lead screw 510. Moreover, second frame 380 translates along fourth axis "E" as third carriage 480 translates along fourth axis "E" because third carriage 480 is attached to second frame 380. Attached to third lead screw 510 is a calibrated rotatable handle 520 for precisely rotating third lead screw 510. Moreover, engaging handle 520 may be electrically-driven automatic feed means 530 for automatically rotating handle 520, so that third carriage 480 is automatically controllably translated along fourth axis "E". By way of example only, and not by way of limitation, feed means 530 may be a Servo Power Feed Unit, Model No. 79507752 available from MSC Industrial Supply Company located in Plainview, Long Island, N.Y. It will be appreciated from the disclosure hereinabove that as third carriage 480 translates along fourth axis "E", first frame 300, second frame 380, and swivel 280 are caused also to simultaneously translate along fourth axis "E".

As best seen in FIGS. 4 and 5, extending outwardly from base 460 are a plurality of elongate arms 540, each arm 540 having an electromagnet 550 attached thereto for removably electromagnetically attaching base 460, and thus machining apparatus 250, to top surface 190 of rotor teeth 170. By way of example only, and not by way of limitation, there may be two arms 540 attached to each of two opposing sides of base 460. Electrically conducting wires 560 electrically connect electromagnets 550 to a control panel 555 which is in turn electrically connected to a power source (not shown) to energize electromagnets 550. By way of example only, and not by way of limitation, control panel 555 may be connected to a 120 volt single phase power source (not shown) for supplying power to control panel 555. Thus, apparatus 250 is capable of being quickly electromagnetically attached to rotor 60 as electromagnets 550 are energized by means of control panel 555 and also capable of being quickly detached from rotor 60 as electromagnets 550 are deenergized by means of control panel 555. By way of example only, and not by way of limitation, each electromagnet 550 may be a Bi-Polar Magnet, Model No. BP-1600 available from Jobmaster Corporation located in Randallstown, Md. Control panel 555 may be a Power Supply Unit, Model No. AU-12-100 available from Jobmaster Corporation. In addition, electromagnets 550 may exert a magnetic holding force of approximately 440 pounds force for securely magnetically connecting apparatus 250 to the workpiece.

As shown in FIGS. 4, 5, 6, 7, and 8, connected to and engaging spindle 260 is drive means 570 for operating or rotating cutting tool 270 to machine cracked portion 285 of rotor tooth 170. Drive means 570 is preferably a hydraulically-operated, reversible, variable speed motor such as a 11.9 cubic inch/revolution Char-Lynn Hydraulic Motor, Catalogue No. 101-10005-007, available from Weinman Pump and Supply Company located in Pittsburgh, Pa. Such a hydraulically-operated motor is driven from a hydraulic power unit 580, such as a Hydraulic Power Unit, Model No. HPU-1E20 available from E. H. Wachs Company located in Wheeling, Ill., for controllably operating the motor. The hydraulic power unit 580 also includes an electric motor, which may be a twenty horse power motor connected to a 480 volt, three phase, 60 hertz power source (not shown) to operate spindle 260 at approximately 140 to 160 revolutions per minute (rpm). Such an electric motor enables the hydraulic motor to develop a hydraulic pressure of approximately 2,000 pounds per square inch (psi). The hydraulic power unit 580 may also include a fifty gallon capacity fluid reservoir (not shown) for supplying hydraulic fluid to the hydraulic motor. Such a hydraulically-operated motor is preferred because it is typically lighter in weight and smaller than comparable all-electric motors. Alternatively, if desired, drive means 570 may be an all-electric, variable speed motor available from E. H. Wachs Company. Engaging drive means 570 and spindle 260 is a continuous belt 575 for rotating spindle 260 such that cutting tool 270 rotates as spindle 260 rotates. A belt cover 577 may be attached to drive means 570 for covering belt 575 to provide a safety barrier between the operator and the rotating belt 575.

Figure 14:
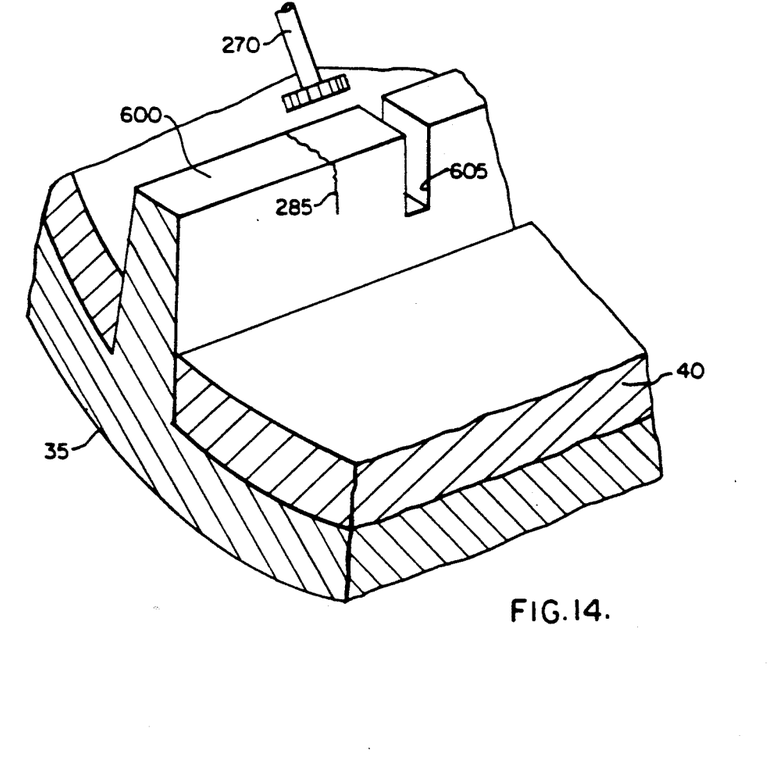
FIG. 14 illustrates a cutting tool, belonging to the alternative embodiment of the machining apparatus, disposed adjacent to a cracked portion of the stator tooth prior to machining and also illustrates a portion of the stator tooth that has been machined by the alternative embodiment of the machining apparatus.
Figure 15:
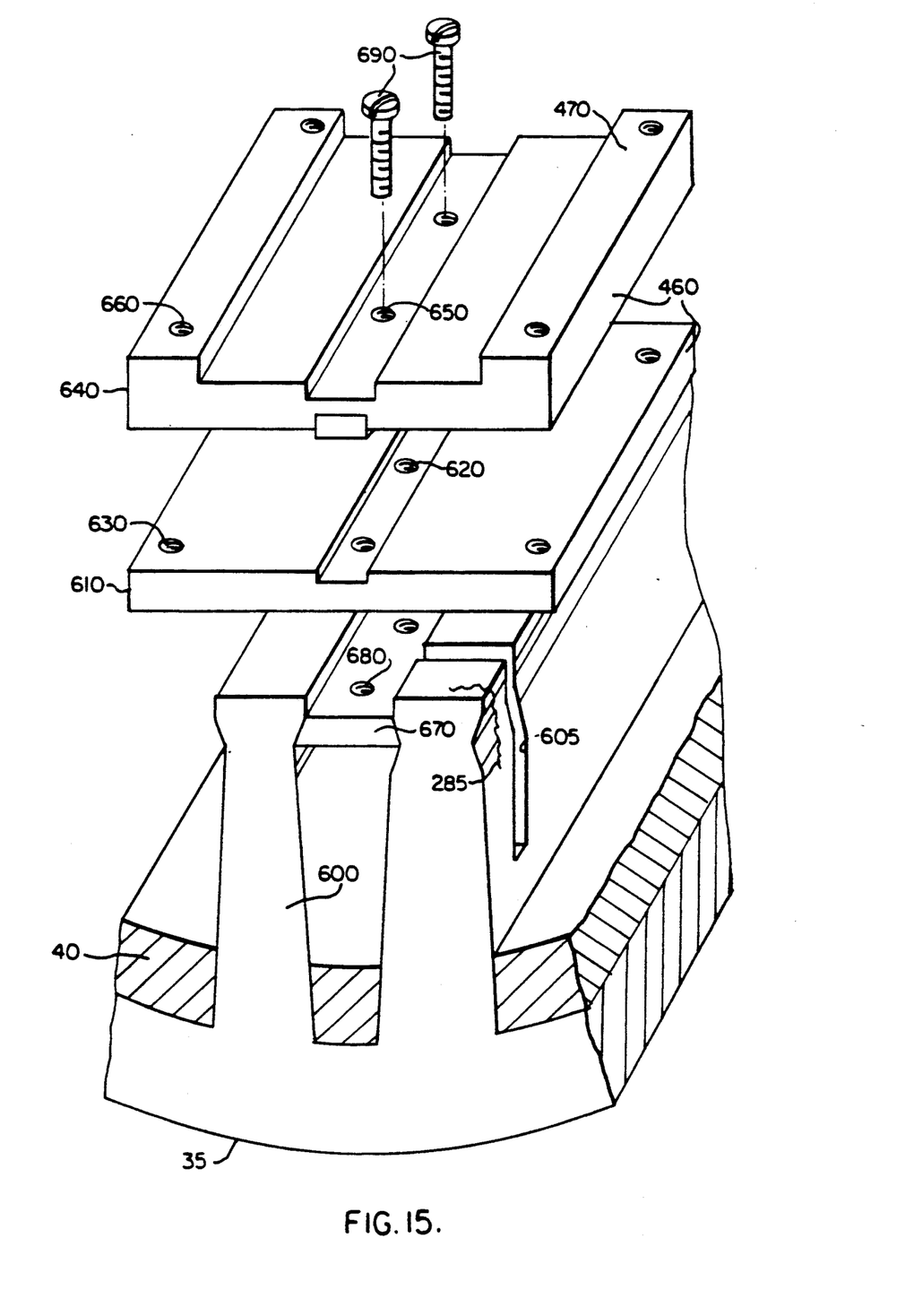
FIG. 15 is an exploded view of a base belonging to the alternative embodiment of the machining apparatus for removably attaching the machining apparatus to the stator.

Turning now to FIGS. 11, 12, 13, 14, and 15 an alternative embodiment of the invention, generally referred to as 590, is there shown for machining spaced-apart stator teeth 600 that extend outwardly from the inside circumference of stator core 35. Machining apparatus 590 is the same as machining apparatus 250 except that arms 540, electromagnets 550 and control panel 555 are absent. Moreover, base 460 does not have concave portion 465. In this regard, base 460 comprises a generally rectangularly-shaped first support plate 610 capable of being mounted on the top surface of stator teeth 600. As best seen in FIGS. 14 and 15, stator tooth 600 may have a cracked portion 285 that is to be machined by cutting tool 270 belonging to apparatus 590. Also shown in FIGS. 14 and 15 is a machined portion 605 that has been previously machined by cutting tool 270 belonging to apparatus 590. First support plate 610 includes a plurality of threaded bores 620 therethrough for reasons disclosed presently. First support plate 610 also includes a plurality of threaded holes 630 for reasons disclosed hereinbelow. Mounted on first support plate 610 is a second support plate 640 having a plurality of threaded bores 650 coaxially aligned with threaded bores 520 in first support plate 610. Moreover, second support plate 640 has a plurality of threaded holes 660 therethrough coaxially aligned with threaded holes 630 of first support plate 610. First support plate 610 and second support plate 640 are connected together by a plurality of screws (not shown) threadably engaging holes 630 and 660. Removably interposed, such as by a press-fit, between preselected stator teeth 600 is a clamping wedge 670 having a plurality of threaded holes 680 therethrough. Threadably engaging bores 620, 650, and 680 are a plurality of screws 690 associated therewith for removably attaching base 460 to clamping wedge 670. Attaching base 460 to clamping wedge 670 also attaches apparatus 590 to stator core 35.

It will be appreciated from the disclosure hereinabove that apparatus 250 and apparatus 590 allow cutting tool 270 to have four degrees of freedom of movement for adjusting cutting tool 270 into cutting engagement with cracked portion 285. That is, cutting tool 270 is pivotable about first axis "B" by means of swivel 280. This provides the first degree of freedom. Cutting tool 270 is translatable along second axis "C" by means of first translation mechanism 290 to provide the second degree of freedom and translatable along third axis "D" by means of second translation mechanism 370 to provide the third degree of freedom. Moreover, cutting tool 270 is translatable along fourth axis "E" by means of third translation mechanism 450 to provide the fourth degree of freedom. Thus, apparatus 250 and 590 enable cutting tool 270 to be adjustably selectively positioned along four axes to precisely cut or remove cracked portion 285 from rotor core tooth 170 or from stator core tooth 600. By way of example only, cutting tool 270 may be fed along third axis "E" at a feed rate of approximately one inch per minute. This is important because, in the case of the typical rotor or stator material (i.e., carbon steel alloy), feeding cutting tool 270 at a rate faster than one inch per minute may cause cutting tool 270 to wear prematurely and feeding cutting tool 270 at a slower rate may unduly prolong the repair operation.

OPERATION

To remove cracked portion 285 from rotor tooth 170, rotor 60 is removed from generator 10 in a manner well known in the art. Rotor 60 may then be mounted on a support, such as support member 140. A suitable nondestructive examination technique, such as ultrasonic examination, is then used to precisely locate cracked portion 285 of rotor tooth 170.

After cracked portion 285 is precisely located, hook 305 of apparatus 250 is engaged by a cable (not shown) belonging to a hoist (not shown). The hoist lifts apparatus 250 and mounts it on the outer circumference of rotor 60 such that concave portion 465 of base 460 matingly rests on the outer circumference of rotor 60 (i.e., concave portion 465 matingly rests on the top surfaces 200 of rotor teeth 170). Moreover, apparatus 250 is mounted on rotor 60 such that key 467 matingly engages the space between preselected adjacent rotor teeth 170. It will be appreciated that concave portion 465 and key 467 assist in stabilizing apparatus 250 on rotor 60, so that apparatus 250 will not laterally tilt as apparatus 250 machines rotor tooth 170. Electromagnets 550 are energized by control panel 555 to electromagnetically attach apparatus 250 to rotor 60.

Handle 440 belonging to second frame 380 is rotated for precisely rotating second lead screw 430. Handle 440 is rotated such that cutting tool 270 is translated a predetermined distance along third axis "D" for positioning cutting tool 270 in the vicinity of rotor tooth 170. Automatic feed means 530 or handle 520 is operated for precisely rotating third lead screw 510. Automatic feed means 530 or handle 520 is operated such that cutting tool 270 is translated a predetermined distance along fourth axis "E" for positioning cutting tool 270 in the vicinity of rotor tooth 170. Handle 360 belonging to first frame 300 is rotated for precisely rotating first lead screw 350. Handle 360 is rotated such that cutting tool 270 is raised or lowered a predetermined distance into the space between rotor tooth 170 for positioning cutting tool 270 adjacent cracked portion 285. Swivel 280 is rotated a predetermined amount (e.g., approximately forty degrees with respect to the longitudinal axis of rotor 60) in an arc about the pivot point on first axis "A" for precisely bringing cutting tool 270 into cutting contact with cracked portion 285.

Motor 570 is operated to rotate belt 575, which in turn rotates spindle 260 for rotating cutting tool 270 to remove cracked portion 285. As cutting tool 270 rotates, automatic feed means 530 is operated to feed cutting tool 270 reciprocatingly back and forth at a predetermined speed (e.g., one inch per minute) to remove cracked portion 285. Confirmation that cracked portion 285 has been removed may be obtained by ultrasonic examination in a manner well known in the art. After cracked portion 285 is removed, a vacuum device (not shown) may be disposed adjacent repaired rotor tooth 170 to suction metal chips removed from rotor tooth 170.

After cracked portion 285 has been removed, apparatus 250 is detached from rotor 60 in a manner that is substantially the reverse of its manner of attachment to rotor 60. Rotor 60 is then replaced into generator 10 in a manner known in the art.

Apparatus 590, which is the alternative embodiment of the invention, is used to machine any cracked stator teeth 600. In this regard, first support plate 610, which belongs to base 460 is connected to clamping wedge 670 by screws 690 and second support plate 640 is connected to first support plate 610, such as by screws (not shown). In this manner, apparatus is attached to stator core 35. It will be appreciated that, in this alternative embodiment of the invention, electromagnets 550 and control panel 555 are not used because apparatus 590 is attached to stator core 35 in the manner disclosed immediately hereinabove. Apparatus 590 is then operated in a manner similar to the operation of apparatus 250 for machining cracked portion 285 in stator tooth 600.

Although the invention is fully illustrated and described herein, it is not intended that the invention as illustrated and described be limited to the details shown, because various modifications may be obtained with respect to the invention without departing from the spirit of the invention or the scope of equivalents thereof. For example, motorized rollers may be connected to base 460 for engaging a circular ring member extending around the outer circumference of rotor 60 or the inner circumference of stator 35. Such rollers may then be operated for rolling apparatus 250/590 around the ring member. Such a ring member would be configured to be removably connected to the rotor or stator. In this modification of the invention, apparatus 250/590 also would be capable of being locked in position at a predetermined location on the ring member to machine cracked portion 285. Apparatus 250/590 thus would be capable rolling around the ring member to a position adjacent the cracked rotor or stator tooth and then locked in place on the ring member. Once locked in place, apparatus 250/590 would be operated in the manner described hereinabove to remove cracked portion 285.

Therefore, what is provided is an adjustable machining apparatus for machining a cylindrical workpiece such as an electrical generator rotor or stator, which machining apparatus obviates the need to repeatedly adjust or reposition the workpiece in order to machine it.

What is claimed is:

1. An adjustable machining apparatus for machining a cylindrical workpiece having a longitudinal, axis, comprising:

(a) gripper means for gripping and rotating a tool about an axis perpendicular to said longitudinal axis, said tool being capable of machining the workpiece;

(b) pivot means, connected to said gripper means, for pivoting said gripper means about a pivot point on a first axis parallel to the longitudinal axis of the workpiece;

(c) first translation means, connected to said pivot means, for translating said pivot means toward and away from the workpiece along a second axis perpendicular to the first axis;

(d) second translation means, connected to said first translation means, for translating said first translation means along a third axis transverse to the longitudinal axis of the workpiece;

(e) third translation means, connected to said second translation means, for translating said second translation means along a fourth axis parallel to the longitudinal axis of the workpiece; and (f) attachment means, connected to said third translation means for removably attaching said third translation means to the workpiece.

2. The apparatus of claim 1, wherein said first translation means comprises:

(a) a first carriage connected to said pivot means, said first carriage having an internally threaded bore therein; and (b) an externally threaded first rod threadably engaging the internally threaded bore of said first carriage for translating said pivot means along the second axis.

3. The apparatus of claim 2, wherein said second translation means comprises:

(a) a second carriage connected to said first translation means, said second carriage having an internally threaded bore therein; and (b) an externally threaded second rod threadably engaging the internally threaded bore of said second carriage for translating said first translation means along the third axis.

4. The apparatus of claim 3, wherein said third translation means comprises:
 (a) a third carriage connected to said second translation means, said third carriage having an internally threaded bore therein; and
 (b) an externally threaded third rod threadably engaging the internally threaded bore of said third carriage for translating said second translation means parallel to the longitudinal axis of the workpiece.

5. The apparatus of claim 1, wherein said attachment means is an electromagnet.

6. The apparatus of claim 1, further comprising drive means connected to said gripper means for operating said gripper means.

7. An adjustable machining apparatus for machining a raised tooth integrally attached to a generally cylindrical workpiece having a longitudinal axis, comprising:
 (a) a spindle for gripping and rotating a cutting tool about an axis perpendicular to said longitudinal axis, said cutting too being capable of removing a portion of the raised tooth;
 (b) a swivel, connected to said spindle, for pivoting said spindle about a pivot point on a first axis parallel to the longitudinal axis of the workpiece;
 (c) a first translation mechanism connected to said swivel for translating said swivel toward and away from the workpiece along a second axis perpendicular to the first axis;
 (d) a second translation mechanism connected to said first translation mechanism for translating said first translation mechanism along a third axis transverse to the longitudinal axis of the workpiece;
 (e) a third translation mechanism connected to said second translation mechanism for translating said second translation mechanism along a fourth axis parallel to the longitudinal axis of the workpiece; and,
 (f) attachment means, connected to said third translation mechanism for removably attaching said third translation mechanism to the workpiece.

8. The apparatus of claim 7, wherein said first translation mechanism comprises:
 (a) a first carriage attached to said swivel, said first carriage having an internally threaded bore therein; and
 (b) a first lead screw threadably engaging the internally threaded bore of said first carriage for threadably translating said first carriage along the second axis.

9. The apparatus of claim 8, wherein said second translation mechanism comprises:
 (a) a second carriage attached to said first translation mechanism, said second carriage having an internally threaded bore therein; and
 (b) a second lead screw threadably engaging the internally threaded bore of said second carriage for threadably translating said first translation mechanism along the third axis.

10. The apparatus of claim 9, wherein said third translation mechanism comprises:
 (a) a third carriage attached to said second translation mechanism, said third carriage having an internally threaded bore therein; and
 (b) a third lead screw threadably engaging the internally threaded bore of said third carriage for threadably translating said second translation mechanism parallel to the longitudinal axis of the workpiece.

11. The apparatus of claim 7, wherein said attachment means is an electromagnet.

12. The apparatus of claim 7, wherein said attachment means is a support plate capable of being connected to the workpiece.

13. The apparatus of claim 7, further comprising a motor connected to the cutting tool for rotating the cutting tool to remove the portion of the rotor tooth.

14. The apparatus of claim 13, wherein said motor is a hydraulically-operated motor.

15. The apparatus of claim 13, wherein said motor is an electrically-operated motor.

16. An adjustable machining apparatus for machining a raised tooth preselected from a plurality of spaced-apart adjacent raised teeth disposed circumferentially around a generally cylindrical workpiece having a longitudinal axis, the raised tooth having a top surface and a depending side surface, the rotor tooth integrally attached to the workpiece and extending parallel to the longitudinal axis thereof, comprising:
 (a) a spindle for gripping and rotating a cutting tool about an axis perpendicular to said longitudinal axis, said cutting too being capable of being interposed between adjacent raised teeth for removing a predetermined portion of the preselected raised tooth;
 (b) a swivel, connected to said spindle, for pivoting said spindle in a predetermined arc about a pivot point on a first axis parallel to the longitudinal axis of the workpiece for disposing the cutting tool into cutting contact with the predetermined portion of the raised tooth;
 (c) a first frame having an elongate track portion, said first frame disposed adjacent said swivel;
 (d) a translatable first carriage connected to said swivel and slidably engaging the track portion of said first frame for translating said swivel toward and away from the workpiece along a second axis perpendicular to the first axis, said first carriage having an internally threaded bore therein;
 (e) a first lead screw rotatably connected to said first frame and threadably engaging the internally threaded bore of said first carriage for threadably slidably translating said first carriage along the second axis as said first lead screw rotates, whereby said swivel translates along the second axis as said first carriage translates;
 (f) a second frame having an elongate track portion, said second frame disposed adjacent said first frame;
 (g) a translatable second carriage connected to said first frame and slidably engaging the track portion of said second frame for translating said first frame along a third axis transverse to the longitudinal axis of the workpiece, said second carriage having an internally threaded bore therein;
 (h) a second lead screw rotatably connected to said second frame and threadably engaging the internally threaded bore of said second carriage for threadably slidably translating said second carriage along the third axis as said second lead screw rotates, whereby said first frame and said swivel translate along the third axis as said second carriage translates;
 (i) a base having an elongate track portion, said base disposed adjacent said second frame;

(j) a translatable third carriage connected to said second frame and slidably engaging the track portion of said base for translating said second frame along a fourth axis parallel to the longitudinal axis of the workpiece, said third carriage having an internally threaded bore therein;

(k) a third lead screw rotatably connected to said base and threadably engaging the internally threaded bore of said third carriage for threadably slidably translating said third carriage along the fourth axis as said third lead screw rotates, whereby said second frame, said first frame, and said swivel translate along the fourth axis as said third carriage translates; and (l) a plurality of electromagnets connected to said base for removably attaching said base to the workpiece as said magnets are energized and for detaching said base from the workpiece as said magnets are deenergized.

17. The apparatus of claim 16, further comprising a motor engaging the cutting tool for rotating the cutting tool to remove the predetermined portion of the raised tooth.

18. The apparatus of claim 17, wherein said motor is a hydraulically-operated, reversible, variable speed motor.

19. The apparatus of claim 17, wherein said motor is an electrically-operated, reversible, variable speed motor.

20. The apparatus of claim 16, wherein said plurality of electromagnets are four electromagnets.

21. The apparatus of claim 16, further comprising a key integrally attached to said base, said key outwardly extending from said base for matingly engaging a space defined by adjacent rotor teeth for stabilizing said base.

* * * * *